April 7, 1964

C. R. MILLER 3,127,739

ROCKET MOTOR WITH CONSUMABLE CASING

Filed Oct. 12, 1961

INVENTOR.
CHARLES R. MILLER

BY *Teller, McCornick, Paulding & Huber*

ATTORNEYS

April 7, 1964   C. R. MILLER   3,127,739
ROCKET MOTOR WITH CONSUMABLE CASING
Filed Oct. 12, 1961   4 Sheets-Sheet 4

United States Patent Office 3,127,739
Patented Apr. 7, 1964

3,127,739
ROCKET MOTOR WITH CONSUMABLE CASING
Charles R. Miller, Rockville, Conn., assignor to United Aircraft Corporation, East Hartford, Conn., a corporation of Delaware
Filed Oct. 12, 1961, Ser. No. 149,142
20 Claims. (Cl. 60—35.6)

This invention relates to a rocket motor with a consumable casing and, more particularly, to a consumable casing motor wherein a nozzle and combustion chamber assembly is advanced along a casing as the casing and a propellant charge therein are consumed.

It is the general object of the invention to provide a rocket motor wherein the motor casing is consumed in flight to enhance the payload delivery capability of the motor and/or to greatly increase the range of a vehicle associated with the motor.

A further and more specific object of the invention resides in the provision of a rocket motor of the type mentioned wherein a combustion chamber is advanced along the length of a propellant charge and a motor casing as the charge and the casing are consumed, the combustion chamber being so constructed and arranged as to exhibit constant-volume characteristics and substantially improved efficiency.

The drawings show four embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
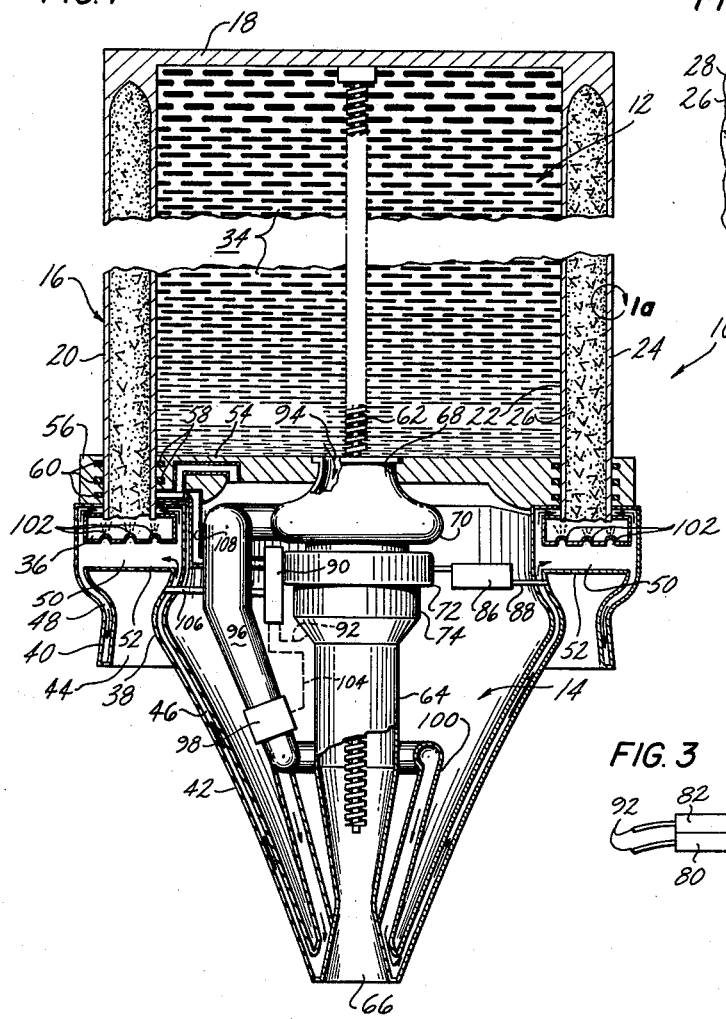
FIG. 1 is a schematic illustration in longitudinal section of a rocket motor forming a first embodiment of the invention.

Referring particularly to FIG. 1, it will be observed that a rocket motor 10 therein comprises a propellant charge assembly 12 and a nozzle and combustion chamber assembly 14. The propellant charge assembly 12 is shown as comprising a casing 16 of generally cylindrical form and which is open at the rear. An upper or front wall 18 of the casing may be conventional in form as shown. Connected with the said upper or front wall and extending downwardly or rearwardly therefrom is a side wall 20 which, in accordance with the invention, is adapted to be consumed in flight.

Figure 1A:
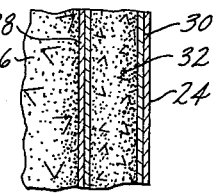
FIG. 1A is an enlarged schematic illustration of a portion of a casing side wall taken as indicated at A in FIG. 1.

The consumable side wall 20 of the casing comprises spaced inner and outer wall members 22 and 24 and a mass of a high energy solid propellant 26 disposed in and substantially filling the space between said members. The inner and outer wall members 22 and 24 may vary in form, but said members are preferably identical and constructed as illustrated in FIG. 1A. Inner and outer skin members 28 and 30 of each wall member are preferably formed in double thickness and of a fast burning metal foil or plastic laminate. A filler 32 disposed between the members 28 and 30 of each wall member preferably comprises a mass of high energy solid propellant.

The cylindrical space within the inner wall member 22 of the casing side wall is substantially filled with a charge of propellant and, in the FIG. 1 embodiment, the rocket motor is of the hybrid type, a liquid propellant being disposed in the casing as indicated at 34. The term liquid propellant is used here in a broad sense and is meant to include mediums characterized by self-sustaining combustion as well as those which provide for combustion only on reaction with other mediums such as the solid propellant 26. As will be seen, liquid propellant in the charge 34 is delivered to an annular combustion chamber 36 and combustion may take place in said chamber either by reaction of the liquid propellant with the solid propellant 26 or, the liquid and solid propellants may burn in commingled relationship but independently of each other.

As will be observed, the combustion chamber 36 is annular in form and is defined by and between inner and outer members 38 and 40 of the combustion chamber and nozzle assembly 14. Said members 38 and 40 also define an exhaust nozzle of the plug type comprising a plug 42 and an annular exhaust port 44 communicating with the combustion chamber 36. Each of the members 38 and 40 is preferably of double thickness and said members respectively define cooling passageways 46 and 48. Passageways 50, 50 interconnecting the passageways 46 and 48 are defined within support struts 52, 52 which extend between the inner and outer members 38 and 40. Two support struts 52, 52 are shown, but a plurality of such struts may be provided in circumaxially spaced relationship in the combustion chamber.

It will be observed that the combustion chamber 36 opens forwardly toward the rear end surface of the side wall 20 of the motor casing 16. The inner and outer chamber defining members 38 and 40 are connected at front end portions respectively with a piston 54 and a support ring 56. The piston 54 and the support ring 56 are disposed respectively within and about the casing side wall 20 and are movable in unison relative to said side wall and along its length. More specifically, and as will be explained more fully hereinbelow, the piston 54 and the support ring 56 are slidable forwardly along the side wall 20 of the casing 16 as the propellant charge 34 and the said side wall are consumed within the combustion chamber 36.

The piston 54 and the support ring 56 are arranged in sealing engagement with the side wall 20 and as shown, a plurality of ring seals 58, 58 are associated with the piston and the wall and a similar plurality of ring seals 60, 60 are associated with the support ring 56 and the wall. Sealing means between the piston and the side wall and between the support ring and the side wall may vary widely in form and the seals 58 and 60 are to be considered illustrative only.

Now it will be apparent that the side wall 20 of the motor casing can be progressively introduced to and consumed in the combustion chamber 36 by moving the chamber forwardly along the same. Means for so moving the chamber will now be described together with a means for delivering liquid propellant from the charge 34 to the combustion chamber, combustion of the liquid propellant thus being effected together with the combustion of the side wall.

Figure 3:
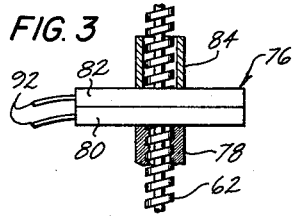
FIG. 3 is an enlarged schematic illustration of a clutch element and a portion of a lead screw shown in FIG. 1.

In the motor of FIG. 1, a means for moving the combustion chamber and nozzle assembly 14 forwardly includes an elongated member 62 in the form of a lead screw and which is connected at a forward end portion to the front wall 18 of the motor casing 16. A rear end portion of the lead screw 62 extends within a generally cylindrical housing 64 disposed within the nozzle plug 42 and which is open rearwardly at 66 through the open rear end portion of said plug. A front end portion of the housing 64 is secured within a suitable aperture 68 in the piston 54 and a pump section 70, a turbine section 72, and a clutch section 74 comprise the housing 64 in front-to-rear order. The pump and turbine sections 70 and 72 respectively contain a fluid pump and a gas turbine and both of said elements may be of conventional construction and require neither illustration nor description. The clutch section 74 of the housing contains a clutch which is preferably of the electrically operated type as indicated schematically at 76 in FIG. 3. The lead screw 62 extends through suitable axial openings in the pump and the turbine within the housing sections 70 and 72 and is engaged with a worm 78 rotatable with a driven member 80 of the clutch 76. A driving member 82 of the clutch 76 is connected with the turbine within the housing 64 by means of a tubular shaft 84 which loosely receives the lead screw as shown in FIG. 3.

Gas under pressure for operating the turbine in the housing section 72 may be supplied initially from a tank 86 and thereafter from the combustion chamber 36 through a conduit 88. With the turbine operating, the driving member 82 of the clutch 76 will be rotated and may be selectively engaged with the driven member 80 to rotate the worm 78 engaged with the lead screw 62. Rotation of the worm 78 causes the clutch 76, the housing 64 and elements therein, the piston 54, the support ring 56, and all remaining elements of the nozzle and combustion chamber assembly 14 to move upwardly or forwardly with respect to the side wall 20 of the motor casing 16. As the combustion chamber and nozzle assembly move upwardly or forwardly, the lead screw 62 projects from the aforesaid rear opening 66 and may be jettisoned sectionally by suitable explosive charges placed at intervals along its length.

Control over the rate of forward movement of the assembly 14 can be exercised through selective engagement of the clutch 76 by means of a control unit 90, FIG. 1. The control unit 90 may be connected with the clutch 76 by suitable conductors 92, 92 shown in FIG. 3 and indicated by broken line in FIG. 1.

Liquid propellant from the charge 34 can be delivered under pressure to the combustion chamber 36 in FIG. 1 through suitable passageways by means of the aforementioned pump disposed within the section 70 of the housing 64. A portion of a pump inlet passageway is shown at 94 and a discharge conduit for the pump is shown at 96. The conduit 96 has a valve 98 disposed therein and through which pump discharge fluid passes to an annular and generally frusto-conical manifold 100. The manifold 100 communicates with and distributes liquid propellant substantially uniformly to the aforementioned passageway 46 within the inner member 38 of the combustion chamber and nozzle assembly 14. Thus, liquid propellant is utilized as a coolant for the plug 42 prior to combustion. From the passageway 46, the liquid propellant flows to the aforementioned strut passageways 50, 50 and thence to the passageway 48 within the outer member 40 of the nozzle and combustion chamber assembly. Small injectors or nozzles 102, 102 deliver the liquid propellant from the strut passageways 50, 50 to the combustion chamber 36 in suitable condition for combustion. As will be observed, the location of the injectors or nozzles 102, 102 is such that the liquid propellant can be directed against the rear end surface of the casing side wall 20. Such arrangement is of particular importance when combustion is dependent upon the reaction of the solid propellant 26 and the liquid propellant from the charge 34.

For regulation of the rate of forward movement of the combustion chamber and nozzle assembly 14 and the burning rate of propellants in the combustion chamber 36, an exemplary control system is shown schematically and will be described generally. However, it is to be understood that the particular control means employed is not necessarily a part of the invention. The use of a wide variety of control means is contemplated.

Figure 2:
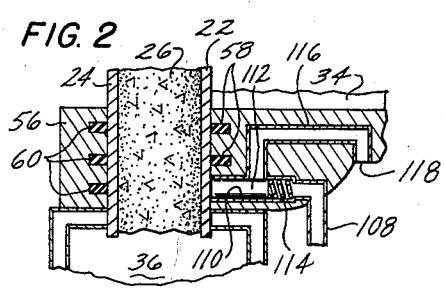
FIG. 2 is an enlarged schematic illustration of a portion of FIG. 1 showing a position sensor.

The aforementioned control unit 90 is connected with the clutch 76 as mentioned and is also operatively associated with the valve 98 in the pump discharge conduit 96. A broken line 104 indicates connecting means between the control unit and the valve. Also connected with the control unit 90 is a pressure sensing line 106 which extends to the combustion chamber 36 and a line 108 which extends to a small plunger bore 110 in the piston 54, FIG. 2. A position sensing plunger 112 in the bore 110 is biased outwardly by a spring 114 into engagement with the inner wall member 22 of the casing side wall 20 and a vent line 116 communicates with the bore 110 adjacent an inner end portion of the plunger 112 and with the interior of the plug 42 at a vent port 118. Thus, a fluid pressure signal in the control unit 90 and in the line 108 can be varied by movement of the plunger 112. If, for example, the plunger 112 moves outwardly due to consumption of the side wall 20 at a rate higher than the rate of forward movement of the combustion chamber, the vent line 116 will be opened to reduce the fluid pressure in the line 108 and in the control unit 90. Conversely, if the rate of forward movement of the combustion chamber and nozzle assembly 14 is such that the side wall 20 is consumed only to the location shown, the plunger 112 will be held in the position shown and pressure will be maintained in the line 108 and the control unit 90.

Details of construction of the control unit 90 and the specific manner in which the unit operates are deemed unnecessary. It will suffice to point out that the said unit can operate to effect selective engagement of the clutch 76 to regulate forward movement of the combustion chamber and nozzle assembly 14 and to thereby effect regulation of the burning rate within the combustion chamber 36 as reflected by fluid pressure signals in the lines 106 and 108. For example, it may be desired to provide a substantially constant pressure condition in the combustion chamber as monitored by the line 106 and the position sensor 112 may be employed as an override device to establish a maximum rate of forward movement. The control unit 90 may also serve to regulate the flow of liquid propellant to the injectors or nozzles 102, 102 through operation of the valve 98. Burning rate can of course also be controlled in this manner and it is presently contemplated that maximum control efficiency may be obtained by the coordinated control of the clutch 74 and the valve 98 by means of the control unit 90.

From the foregoing it will be apparent that the consumption of a casing side wall together with the consumption of a propellant charge has been provided for. The aggregate unproductive weight that a vehicle carries during flight is thus greatly reduced and a substantial increase in payload delivery capability and/or a substantial increase in range is provided for. Moreover, it will be observed that the combustion chamber 36 is of the constant-volume type so as to provide a substantial improvement in combustion efficiency. Finally, it is to be observed that a means for positively emptying a motor casing of liquid propellant is provided. In conventional liquid or hybrid rocket motors, difficulties may be encountered in achieving complete consumption of the liquid propellant. In the FIG. 1 motor, the piston 54 serves to pressurize liquid propellant 34 as it moves forwardly and insures that substantially all of the propellant is consumed.

Figure 4:
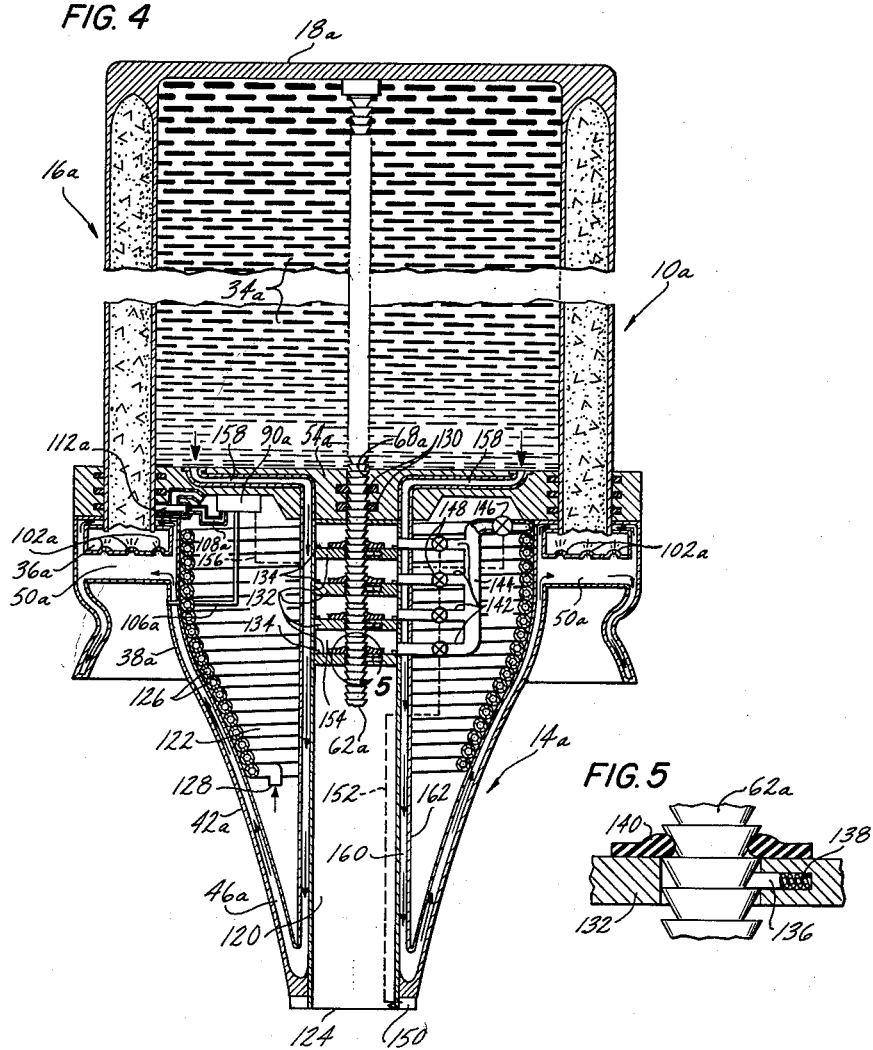
FIG. 4 is a schematic illustration in longitudinal section of a rocket motor forming a second embodiment of the invention.

In FIG. 4 there is shown a rocket motor 10a which is substantially the same as the motor 10 except for a means for delivering propellant to a combustion chamber 36a and a means for moving a combustion chamber and nozzle assembly 14a forwardly with respect to a casing 16a and a main propellant charge 34a. A piston chamber 120 formed within a plug 42a is surrounded by an annular chamber 122 which is filled with a gas under pressure. The piston chamber 120 is open at the rear at 124 and the annular gas chamber 122 has a heat exchange means comprising a plurality of tubes or coils 126, 126 disposed therein. The tubes or coils 126, 126 are wound spirally within an inner member 38a of the combustion chamber and nozzle assembly 14a. A heat exchange inlet 128 is provided for the introduction of pressurized gas from the chamber 122 and heat is transferred through the member 38a from the combustion chamber 36a and from hot gases adjacent the plug 42a to heat gas within the coils 126, 126 and to thereby increase its pressure. Thereafter, the gas, at a high pressure, is employed as a source of power for moving the combustion chamber and nozzle assembly 14a forwardly along the casing 16a.

An elongated member 62a similar to the lead screw 62 but in the form of a cylindrical ratchet rod is connected to a front wall 18a of the casing and extends rearwardly through a suitable aperture 68a in a piston 54a. The piston 54a is slidable forwardly along the rod 62a and sealing means are provided as indicated at 130. Rearwardly of the piston 54a and within the piston chamber 120, a plurality of small piston means are provided for operative engagement with the rod 62a. As shown, four pistons 132, 132 are provided and they are spaced apart with stop means 134, 134 associated respectively therewith to limit movement of the same in a forward direction relative to the combustion chamber and nozzle assembly.

Figure 5:
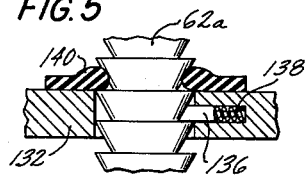
FIG. 5 is an enlarged schematic illustration taken as indicated at 5 in FIG. 4.

The pistons 132, 132 are each provided with a pawl pin 136 best illustrated in FIG. 5 and said pin is operatively engageable with the ratchet rod 62a. Each pin 136 is urged inwardly into engagement with the rod 62a by means of a bias spring 138. Thus, the pistons 132, 132 are each prevented from moving rearwardly with respect to the rod 62a, but forward movement of the pistons relative to the rod is not affected by the pawl pin. Also associated with each of the pistons 132 is a ring seal 140, FIG. 5, which is urged into sealing engagement between its piston and the rod 62a by gas under pressure above or forwardly of the piston.

Referring again to FIG. 4 it will be seen that each of the pistons 132, 132 has an associated gas supply conduit 142. The gas supply conduits 142, 142 are disposed respectively on upper or forward sides of the pistons 132, 132 and each of said conduits communicates with a manifold conduit 144 which in turn is connected with the heat exchanger coils 126, 126 through a valve 146. Each of the gas supply conduits 142, 142 also has a valve 148 disposed therein and a switch 150 is connected with each of the valves 148, 148 as indicated by a broken line 152. The switch 150 is disposed adjacent the opening 124 at the rear of the nozzle plug 42a and is adapted to be operated by the pistons 132, 132 as will be explained hereinbelow.

With the valve 146 open, it will be apparent that gas under high pressure will flow through the manifold conduit 144 to each of the gas supply conduits 142, 142 and to each of the valves 148, 148. With the lowermost valve 148 open, high pressure gas will be introduced to a chamber 154 between the lowermost piston 132 and the next adjacent piston 132. Such high pressure gas will serve to provide for tight sealing engagement of the seal 140 associated with the said lowermost piston and will effect forward movement of the said next adjacent piston 132 and the assembly 14a. When the said next adjacent piston 132 and the assembly 14a have moved forwardly so that the rear end portion of the plug 42a reaches the lowermost piston 132, the switch 150 will be actuated and will open the valve 148 associated with said next adjacent piston 132. The foregoing operation will then be repeated until all of the pistons 132, 132 have been rendered operable and the combustion chamber and nozzle assembly 14a has been advanced along the entire length of the casing 16a. Preferably, explosive charges are provided to jettison the pistons 132, 132 and portions of the rod 62a successively.

In order to regulate forward movement of the combustion chamber and nozzle assembly 14a as effected by operation of the valves 148, 148, the switch 150, and the pistons 132, 132, it is the presently preferred practice to provide for operation of the valve 146 by a control unit 90a. The control unit 90a is connected with the valve 146 as indicated by broken line 156 and is provided with a pressure sensing line 106a and a position sensing line 108a extending to a position sensor 112a. Thus, it will be seen that the control unit 90a can be employed to regulate the valve 146 whereby to control the pressure of the gas acting upon the pistons 132, 132 and to thereby control the rate of forward movement of the combustion chamber and nozzle assembly 14a. Such control can be effected to regulate combustion chamber pressure as monitored by the sensing line 106a and to provide a maximum limit on the rate of forward movement as established by the position sensor 112a.

Means for delivering liquid propellant from the charge 34a to the combustion chamber 36a in FIG. 4 take the form of a piston 54a and suitable fluid passageways 158, 158 in said piston, a passageway 160 in a wall 162 defining the piston chamber 120, a cooling passageway 46a, and strut passageways 50a, 50a associated with injectors or nozzles 102a, 102a. Pressurization of the liquid propellant 34a by forward movement of the piston 54a is depended upon to provide flow at a desired rate through the said passageways and injectors or nozzles. If desired, valve means may be provided for regulating the rate of flow of liquid propellant to the combustion chamber 36a.

Figure 6:
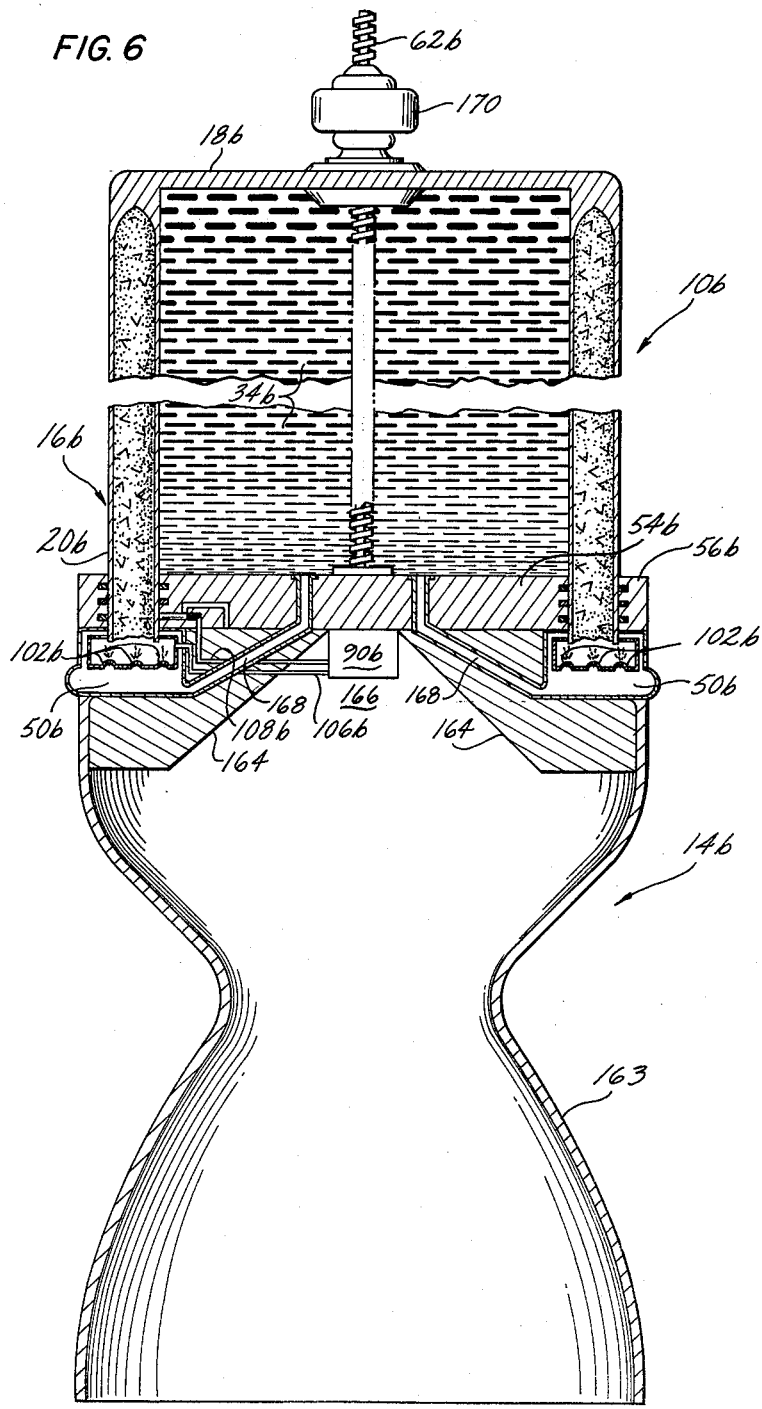
FIG. 6 is a schematic illustration in longitudinal section of a rocket motor forming a third embodiment of the invention.

In FIG. 6 there is shown a rocket motor 10b which is generally similar to the motors 10 and 10a but which includes a conventional convergent-divergent nozzle 163 in a combustion chamber and rocket assembly 14b. The nozzle 163 is connected with and supported by a piston 54b, a support ring 56b, and a plurality of circumaxially spaced support struts 164, 164, two shown. A cylindrical combustion chamber 166 is provided and is partially sectionalized by the struts 164, 164. Fluid passageways 168, 168 through the piston 54b and the struts 164, 164 extend to strut passageways 50b, 50b to communicate with injectors or nozzles 102b, 102b. Pressurization of a liquid propellant charge 34b by forward movement of the piston 54b is depended upon for delivery of the propellant through the passageways 168, 168, the passageways 50b, 50b, and the injectors or nozzles 102b, 102b to the combustion chamber 166. While not shown, appropriate passageways may be provided in the nozzle 162 for the passage of liquid propellant for cooling purposes.

Means for moving the combustion chamber and nozzle assembly 14b forwardly along a nozzle casing 16b are shown as comprising a lead screw 62b fixedly connected with the piston 54b at a rear end portion. At a front end portion, the lead screw 62b is operatively associated with a clutch and motor assembly 170 mounted on a front wall 18b of the motor casing. The clutch and motor assembly 170 may vary in form and may for example comprise an electric motor and an electrically operable clutch regulable from a control unit 90b. The control unit 90b may have an associated pressure sensing line 106b and a position sensing line 108b.

The mode of operation of the rocket motor of FIG. 6 should be apparent from the foregoing. Liquid propellant is introduced to the combustion chamber under pressure through the above-mentioned passageways and the injectors or nozzles 102b, 102b. The side wall 20b of the casing is introduced progressively to the chamber by forward movement of the latter under regulation of the control unit 90b and as effected by operation of the motor 170. Here also, suitable valve means may be provided for regulating the flow of liquid propellant to the combustion chamber 166 and other refinements of control not shown are contemplated within the scope of the invention.

Figure 7:
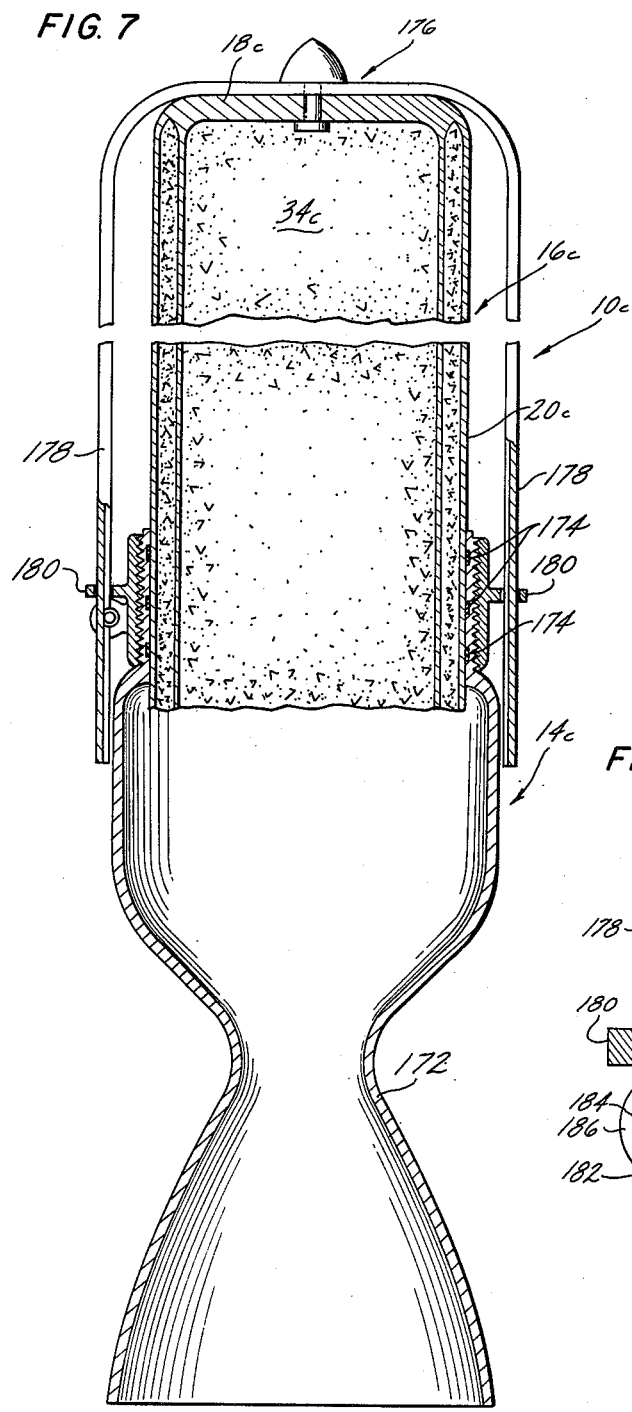
FIG. 7 is a schematic illustration in longitudinal section of a rocket motor forming a fourth embodiment of the invention.

FIG. 7 illustrates a rocket motor 10c forming a fourth embodiment of the invention and wherein a main propellant charge 34c comprises a solid propellant. A conventional convergent-divergent nozzle 172 is included in a combustion chamber and nozzle assembly 14c. At a forward end portion the combustion chamber and nozzle assembly 14c is disposed about and in sealing engagement with a side wall 20c of a motor casing 16c. Illustratively, ring seals may be provided as at 174, 174 between the side wall 20c of the casing and the combustion chamber and nozzle assembly.

Means for moving the combustion chamber and nozzle assembly 14c forwardly along the casing 16c are shown as comprising a spider indicated generally at 176. The spider 176 is fixedly connected at a forward end or body portion with a front wall 18c of the motor casing and has a plurality of elongated legs 178, 178 which extend rearwardly adjacent the casing side wall 20c and the forward portion of the combustion chamber and nozzle assembly 14c. Guide brackets 180, 180 at the forward end portion of the combustion chamber and nozzle assembly slidably receive the legs 178, 178.

Figure 8:
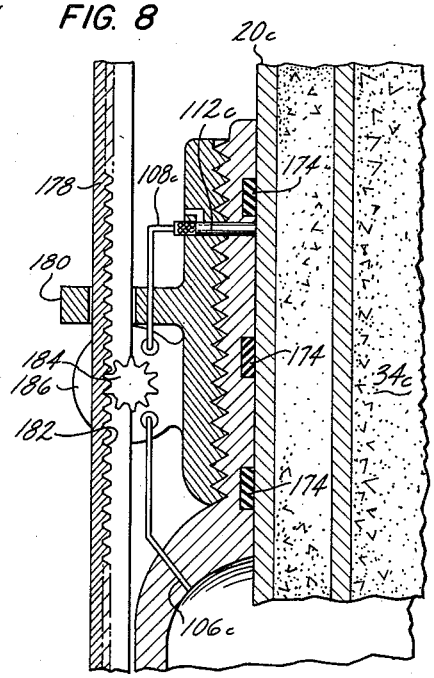
FIG. 8 is an enlarged schematic illustration of a portion of the motor of FIG. 7, a rack, pinion, and drive motor thereof being shown.

At least one of the legs 178, 178 and, as shown, the left-hand leg 178, is provided with a rack 182, FIG. 8, and the said rack is operatively associated with a pinion 184 driven by a motor and control unit 186. The motor and control unit 186 is mounted on a front end portion of the combustion chamber and nozzle assembly 14c and is shown as having an associated pressure sensing line 106c and a position sensing line 108c. Thus, the combustion chamber and nozzle assembly 14c can be moved forwardly along the casing 16c by operation of the pinion 184 and the motor and control assembly 186, the rate of forward movement and the burning rate being controlled responsive to combustion chamber pressure as reflected by the sensing line 106c and also responsive to a position sensor 112c associated with the line 108c.

As in the case of the hybrid motors of FIGS. 1, 4 and 6, the substantial advantages of case consumption are obtained with the rocket motor of FIGS. 7 and 8. Payload delivery capability and/or range can be substantially increased and a constant-volume combustion chamber is provided to the end that combustion efficiency is substantially enhanced.

The invention claimed is:

1. The combination in a rocket motor of a propellant charge assembly comprising an elongated casing having a front wall and a consumable side wall and a propellant charge disposed in and substantially filling the casing, a nozzle and combustion chamber assembly disposed at and surrounding a rear end portion of the casing side wall and movable forwardly along the length thereof, and means for advancing said combustion chamber and nozzle assembly along the casing such that the side wall of the latter and the propellant charge are consumed within the last mentioned assembly.

2. The combination in a rocket motor of a propellant charge assembly comprising an elongated casing having a front wall and a consumable side wall and a propellant charge disposed in and substantially filling the casing, a nozzle and combustion chamber assembly disposed at and surrounding a rear end portion of the casing side wall and movable forwardly along the length thereof, and means for advancing said combustion chamber and nozzle assembly along the casing such that the side wall of the latter and the propellant charge are consumed within the last mentioned assembly, said last-mentioned means comprising at least one elongated member separate from the casing side wall and which is connected with the front wall of the casing and with the combustion chamber and nozzle assembly and also comprising a power operated mechanism operatively associated with said member for effecting forward movement of the combustion chamber and nozzle assembly.

3. The combination in a rocket motor as set forth in claim 2 wherein said consumable side wall comprises spaced inner and outer wall members and a solid propellant disposed in and substantially filling the space therebetween.

4. The combination in a rocket motor as set forth in claim 1 wherein said propellant charge comprises a mass of solid propellant, and wherein said driving means comprises a spider fixedly connected with the front wall of the casing and having elongated rearwardly extending legs and a power operated mechanism operatively associated with one of said legs for effecting forward movement of the combustion chamber and nozzle assembly.

5. The combination in a rocket motor as set forth in claim 2 wherein the propellant in said charge is of the liquid type, and wherein said last-mentioned means also comprises means including a fluid passageway for delivering liquid propellant under pressure from the propellant charge to the combustion chamber.

6. The combination in a rocket motor as set forth in claim 5 wherein said propellant delivering means includes a piston movable forwardly within the casing side wall for pressurizing the liquid propellant charge.

7. The combination in a rocket motor as set forth in claim 5 wherein said propellant delivering means includes a pump operable to transmit propellant through said passageway under pressure from the propellant charge to the combustion chamber.

8. The combination in a rocket motor of an elongated hollow cylindrical casing which has a front wall and a consumable side wall open at the rear, said side wall comprising inner and outer wall members and a solid propellant disposed in and substantially filling the space therebetween, a charge of liquid propellant within the inner side wall member of said casing, a forwardly slidable piston member disposed in said casing in sealed relationship with the inner wall thereof at the rear end portion thereof, a forwardly slidable annular support ring disposed in sealing engagement with the outer wall member of said casing at a rear end portion thereof, means defining a combustion chamber and a nozzle fixedly connected with said piston member and support ring with the combustion chamber arranged adjacent and open toward the rear end surface of said casing side wall, means for delivering liquid propellant from said charge to said combustion chamber, and means connected with the front wall of said casing and adapted to drive said piston, said support ring, and said combustion chamber and nozzle defining means forwardly along said casing as the side wall thereof and the propellant charge are consumed.

9. The combination in a rocket motor as set forth in claim 8 wherein the combustion chamber is annular in form and the nozzle is of the plug type and open rearwardly, wherein said drive means comprises an elongated member connected with the front wall of the casing and extending rearwardly so as to pass through said piston and nozzle as the latter move forwardly, and wherein said drive means also comprises a power operated means engageable with said elongated member and operable to draw said piston, support ring, combustion chamber, and nozzle forwardly along the casing.

10. The combination in a rocket motor as set forth in claim 9 wherein said elongated member comprises a lead screw, and wherein said power operated means comprises a turbine drivingly connectible with the lead screw through a clutch and a screw engaging member rotatable about the screw but fixed with respect to said piston, support ring, combustion chamber, and nozzle.

11. The combination in a rocket motor as set forth in claim 10 wherein said clutch is of the selectively engageable type, and wherein there is provided a control means for engaging and disengaging said clutch and thereby regulating the rate of forward movement of said piston, support ring, combustion chamber, and nozzle.

12. The combination in a rocket motor as set forth in claim 9 wherein said power operated means comprises a plurality of piston means selectively engageable with said elongated member, and wherein said drive means also comprises a supply of fluid under pressure and means for selectively delivering said fluid to said piston means to urge said piston, support ring, combustion chamber, and nozzle forwardly, each of said piston means being fixed against forward movement relative to said piston, support ring, combustion chamber, and nozzle.

13. The combination in a rocket motor as set forth in claim 12 wherein said supply of fluid under pressure is disposed within said nozzle, and wherein there is also provided within said nozzle a heat exchanger means adapted to heat said fluid and to increase the pressure thereof prior to the delivery of the same to said piston means.

14. The combination in a rocket motor as set forth in claim 13 wherein said elongated member comprises a ratchet rod, and wherein each of said piston means is provided with a pawl for fixing the piston means against rearward movement relative to the rod.

15. The combination in a rocket motor as set forth in claim 14 wherein the means for selectively delivering fluid under pressure to said piston means comprises a plurality of valves operable selectively to introduce fluid respectively to said piston means.

16. The combination in a rocket motor as set forth in claim 8 wherein said nozzle is of the convergent-divergent type and is connected at a front end portion to said support ring, and wherein support means is provided for fixedly interconnecting said piston and said front end portion of said nozzle, said support means serving also to define a fluid passageway connecting said combustion chamber with said propellant charge.

17. The combination in a rocket motor as set forth in claim 16 wherein said drive means comprises an elongated member connected with said piston and extending forwardly through the front wall of said casing, and wherein said drive means also comprises a power operated means mounted on the front wall of the casing and engageable with said elongated member and operable to draw the member forwardly whereby to similarly move said piston, support ring, combustion chamber, and nozzle.

18. The combination in a rocket motor as set forth in claim 17 wherein said elongated member comprises a lead screw, and wherein said power operated means comprises a motor and a connected lead screw engaging and driving member.

19. The combination in a rocket motor of an elongated hollow cylindrical casing which has a front wall and a consumable side wall and which is open at the rear, said side wall comprising inner and outer wall members and a solid propellant disposed in and substantially filling the space between said members, a charge of solid propellant disposed within the inner side wall member of said casing, a combustion chamber and convergent-divergent nozzle assembly disposed at and surrounding a rear end portion of said casing in sealing engagement with the outer side wall thereof and adapted to slide forwardly therealong, a spider fixedly connected with the front wall of said casing and having a plurality of elongated legs which extend rearwardly adjacent the side wall of the casing and a front end portion of said combustion chamber and nozzle assembly, and power operated means on said assembly engageable with at least one of said spider legs and operable to move the assembly forwardly along said casing such that the side wall thereof and the propellant charge are consumed within the assembly.

20. The combination in a rocket motor as set forth in claim 19 wherein one of said spider legs has a rack formed thereon, and wherein said power operated means comprises a motor and a connected pinion engaging said rack.

References Cited in the file of this patent
UNITED STATES PATENTS

| 3,017,746 | Kiphart | Jan. 23, 1962 |
| 3,043,221 | Swanser | July 10, 1962 |